United States Patent [19]

Palaniswami

[11] Patent Number: 5,740,420

[45] Date of Patent: Apr. 14, 1998

[54] SYSTEM AND METHOD FOR COMPILING AND EXECUTING SEQUENCES OF MACRO AND MICRO INSTRUCTIONS

[75] Inventor: Krishnan Palaniswami, Austin, Tex.

[73] Assignee: Advanced Micro Devices, Inc., Sunnyvale, Calif.

[21] Appl. No.: 548,661

[22] Filed: Oct. 26, 1995

[51] Int. Cl.⁶ .................................................. G06F 9/22
[52] U.S. Cl. ...................... 395/595; 395/598; 395/421.09
[58] Field of Search ......................... 395/436, 412, 395/421.05, 421.07, 421.08, 421.09, 421.1, 421.11, 384, 387, 564, 568, 571, 572, 589, 590, 595, 561, 598

[56] References Cited

U.S. PATENT DOCUMENTS

| | | | |
|---|---|---|---|
| 3,824,562 | 7/1974 | Leibowitz et al. | 395/436 |
| 3,889,242 | 6/1975 | Malmer, Jr. | 395/567 |
| 3,991,404 | 11/1976 | Brioschi et al. | 395/598 |
| 4,415,969 | 11/1983 | Bayliss et al. | 395/568 |
| 4,631,663 | 12/1986 | Chilinski et al. | 395/570 |
| 4,791,590 | 12/1988 | Ku et al. | 395/726 |
| 4,811,267 | 3/1989 | Ando et al. | 395/436 |
| 4,862,407 | 8/1989 | Fette et al. | 395/800 |
| 4,901,235 | 2/1990 | Vora et al. | 395/597 |
| 5,155,819 | 10/1992 | Watkins et al. | 395/800 |
| 5,220,656 | 6/1993 | Itomitsu et al. | 395/387 |

OTHER PUBLICATIONS

Nelson, "Microprocessors With Shift-Register Instruction Stores", IBM Technical Disclosure Bulletin, vol. 21, No. 12, May 1979, Armonk, US, p. 5075 XP002024312.

PCT International Search Report for PCT/US96/16461, dated Feb. 14, 1997.

*Primary Examiner*—Parshotam S. Lall
*Assistant Examiner*—Viet Vu
*Attorney, Agent, or Firm*—Kevin L. Daffer; Conley, Rose & Tayon

[57] ABSTRACT

A digital signal controller is provided having modular operation. Specifically, the digital signal controller includes a sequence control unit and a sequencer for producing a sequence of macro instructions and a sequence of micro instructions, respectively. Changes in the number or order of macro instructions may not require changes to the number and order of micro instructions and vice versa. As such, changes in macro instructions can occur by modifying the sequence control unit and possibly the decoder without necessarily changing the sequencer. Changes in the number and order of micro instructions requires changes in the sequencer and possibly the decoder without necessarily changing the sequence control unit. The aforementioned modular technique of forwarding macro and micro instructions to a decoder for controlling an execution unit arranged between an analog interface unit and a DSP allows variability in the operation of the DSP, as well as variability in the design implementation of changes to the digital signal controller.

26 Claims, 7 Drawing Sheets

SYSTEM AND METHOD FOR COMPILING AND EXECUTING SEQUENCES OF MACRO AND MICRO INSTRUCTIONS

BACKGROUND OF THE INVENTION

1. Field of the Invention

This invention relates to a digital signal controller supportive of a sequence of macro and micro instructions which can be modularly re-configured to vary signal transfer and/or signal manipulation within the digital signal controller.

2. Description of the Relevant Art

Digital signal processing is generally well known. Digital signal processors (DSPs) use specialized hardware and software routines, having extensive applications in telecommunications. Exemplary applications include use with modems, data transfer units, computers, vocoders, codecs, digital filters, and transmultiplexers. There are numerous consumer products employing DSPs in compact disc systems, digital television receivers, digital radio receivers and telephones, etc. Digital signal processing thereby represents numerous diverse applications generally regarded in a broad sense as digital audio technology.

DSPs are concerned primarily with the manipulation of audio samples. As audio samples arrive upon the DSP, they are transferred and manipulated according to programmed algorithms. The audio samples are produced by various techniques set forth in conventional analog-to-digital converters or modulators, some of which are the earlier pulse code modulators or the more recent oversampled modulators employing switched capacitors. DSPs perform relatively fast algorithmic manipulations upon sampled data, such manipulations include, for example, scaling, delay, and addition.

In a codec example, algorithmic manipulations are performed upon the digital data stream of converted analog signals (i.e., coding). The digital signals, after manipulation, are forwarded back to a digital-to-analog converter for re-presentment in analog form (i.e., decoding). The codec includes a digital filter which utilizes the aforesaid scaling, delay and addition data manipulation carried forth in a repetitive fashion. Common digital filters include finite impulse response (FIR) filters, infinite impulse response (IIR) filters, notch filters, low pass filters, and comb filters. The rate at which data is sent through the filter can change periodically. For example, data rate can decrease through decimation, or increase through interpolation. Filtering and data rate changes encompass operations which can be more easily performed in the digital format rather than in the analog format. Therefore, a codec employing digital filtering, decimation, and interpolation can take full advantage of DSP features. A codec, however, is but one example of a type of DSP usage.

Conventional DSPs utilize a somewhat simple processor core compared to the more complex x86-compatible core units. The DSP decode logic and core are designed with a specific implementation in mind. Namely, the conventional decode logic and core of a DSP are derived from a unique set of state machine operations necessary to perform desired algorithmic manipulations. Unfortunately, once designed, the decode logic and core cannot be easily updated. For example, changes in a sequence of instructions (i.e., "macro instructions") necessary to carry out algorithmic manipulation within the core may require change not only in the decode logic and core processor but also within the entire control unit of the core. It would therefore be desirable to undertake a design which can change, for example, the sequence of macro instructions (i.e., the number or order of macro instructions) without having to change various instructions (i.e., micro instructions) carried out within a functional block enabled by the macro instructions. More specifically, a sequence of micro instructions within a functional block enabled at several different times within the sequence of macro instructions remains the same regardless of a change in order, addition of, or subtraction of, steps within the macro instruction sequence.

Macro instructions are therefore those instructions necessary to carry out specific algorithmic manipulation (i.e., arithmetic operations and/or data transfer). Among other things, it is desirable that macro instructions be defined to enable a specific functional block. A sequence of micro instructions are attributed to a specific functional block (e.g., decimate, interpolate, low pass filter, etc.) associated with a data flow path. A particular functional block, and therefore a particular sequence of micro instructions, are called upon possibly several times during a sequence of macro instructions. It is desirable in many instances to change the order by which functional blocks are enabled (i.e., change to the order of macro instructions) without changing the micro instruction sequence within each functional block. The aforementioned desirous modular technique thereby allows partial change to a unit which controls the order or quantity of macro instructions, while not requiring change to a unit which control the order or quantity of micro instructions associated with each functional block enabled one or more times throughout the macro sequence. Conversely, it may be desirable to change micro instructions of one or more functional blocks called upon during a sequence of macro instructions.

SUMMARY OF THE INVENTION

The problems outlined above are in large part solved by incorporating a digital signal controller between a conventional DSP and a unit which performs analog-to-digital and digital-to-analog conversion. The digital signal controller employs a modular architecture comprising a sequence control unit and a sequencer. The sequence control unit keeps track of a current macro instruction step within a sequence of macro instructions, while the sequencer keeps track of a current micro instruction step within a sequence of micro instructions. Modifications in the order and number of only the macro instructions do not require changes to the sequencer. Conversely, changes to only the micro instructions within a particular functional block do not require changes to the sequence control unit. Accordingly, the present design is a modular design which can adapt and retrofit to existing DSPs without having to change the DSP and without having to change the entire digital signal controller whenever macro or micro instructions change. Changes in data transfer or manipulation routines are performed within the digital signal controller instead of the DSP. Additionally, changes in data transfer and manipulation might only require changes to a portion of the digital signal controller rather than the entire controller. The aforesaid modular architecture allows more flexibility and versatility in the usage of conventional DSPs.

The digital signal controller hereof can be employed in any application requiring a DSP. According to one embodiment, the digital signal controller is employed between an analog interface unit and a DSP when carrying forward codec operations.

Broadly speaking, the present invention contemplates a digital signal controller. The digital signal controller comprises a sequence control unit which, when operating, produces a signal indicating a current macro instruction within a sequence of macro instructions. The controller further includes a sequencer coupled to receive initiation of the current macro instruction from the sequence control unit and, the sequencer then produces a signal indicating a current micro instruction within a sequence of micro instructions attributable to the current macro instruction. The controller further includes a decoder coupled to the sequence control unit and the sequencer for operably producing a current control signal upon receipt of the current macro instruction and the current micro instruction. The controller still further includes an execution unit coupled to the decoder for performing transfer and/or algorithmic manipulations of data according to the current control signal.

The present invention further contemplates a codec having a digital signal controller coupled between an analog interface unit and a DSP for transferring and manipulating, according to a sequence of macro and micro instructions, digital information between the analog interface unit and the DSP. The digital signal controller comprises a decoder, a sequence control unit and a sequencer interconnected with one another. The decoder is coupled to iteratively produce control signals upon iterative receipt of the sequence of macro and micro instructions from the sequence control unit and the sequencer, respectively. The digital signal controller further includes an execution unit coupled to an output of the decoder for performing, according to the control signals from the decoder, a sequence of transfers and arithmetic manipulations of data sent between the analog interface unit and the DSP.

The present invention still further contemplates a method for controlling a sequence of instructions. The method includes providing a decoder, and issuing a macro instruction within a sequence of macro instructions to the decoder. Micro instructions are also issued within a sequence of micro instructions to the decoder. The current sequence of micro instructions is unique to the current macro instruction drawn from a sequence of macro instructions for causing digital signal manipulation according to the current step of issued macro and micro instructions.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
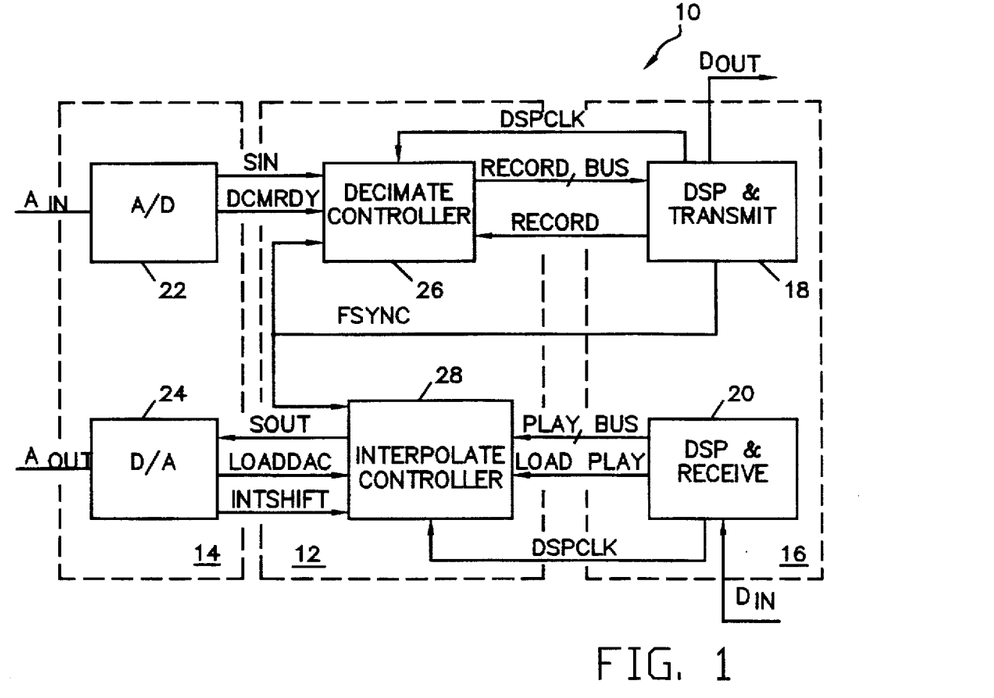
FIG. 1 is a block diagram of a digital signal controller incorporated into a codec, according to an exemplary embodiment of the present invention.

Turning now to the drawings, FIG. 1 is a block diagram of a combination analog and digital transfer and processing system 10. System 10 can perform, according to one embodiment, a codec operation. System 10 includes a digital signal controller 12 interposed between an analog interface unit 14 and a DSP 16. DSP 16 is of well known design, and includes any processing and storage device which can receive digital information over a bus, manipulate that information, and transmit digital information over another bus, referred to as RECORD BUS and PLAY BUS, respectively. A suitable DSP 16 can be obtained from, for example, Analog Devices, Inc., Part No. 2171. DSP 16 thereby includes a transmit processor for transmitting information, and a receive processor for receiving information, labeled as numerals 18 and 20, respectively. Transmit block 18 receives information over RECORD BUS, performs data manipulation, and forwards the resulting data as possibly Dout. Receive block 20 receives Din data, performs data manipulation, and places that information upon the PLAY BUS. RECORD BUS and PLAY BUS are activated by enabling signals sent over RECORD and LOAD PLAY conductors, respectively. Analog interface 14 includes both an analog-to-digital converter 22 and a digital-to-analog converter 24. Converter 22 samples and converts an analog input signal, Ain, to a series of digital signals representative of the analog signal. The series of digital signals is represented as SIN. Digital-to-analog block 24 receives a series of digital signals on conductor SOUT, and converts those signals to analog format as Aout. Serial transfer of SIN is performed when DCMRDY is active, and a serial transfer of SOUT is performed when LOAD DAC is active. SOUT digital information is clocked or strobed at each transition of INTSHIFT.

Digital signal controller 12 is used to link analog interface 14 to a conventional DSP 16. Accordingly, DSP 16 need not be modified to achieve the modularity of the present design. Digital signal controller 12 is shown having, for example, two data paths. One data path allows transfer of SIN from analog interface 14 to DSP 16, and another data path allows transfer of PLAY BUS information from DSP 16 to analog interface 14. Digital signal controller 12 functions, however, not only as a data transfer intermediary but can also perform algorithmic manipulations on the data being transferred. Algorithmic manipulations are inherent to digital filtering, decimation and interpolation carried forth in decimate controller 26 and interpolate controller 28. Upon receiving an active DCMRDY signal, decimate controller 26 enables receipt of SIN data and, according a decimation filter algorithm, performs manipulation upon that data prior to sending it as RECORD BUS information to transmit block 18. Conversely, upon receiving a LOADDAC signal, interpolate controller 28 forwards PLAY BUS information through an interpolation algorithm before presenting it as SOUT signal to digital-to-analog converter 24. It is appreciated from the diagram of FIG. 1 that RECORD signal, LOAD PLAY signal, DCMRDY signal and LOADDAC signal are enable signals for transfer of digital information through controller 12.

Figure 2:
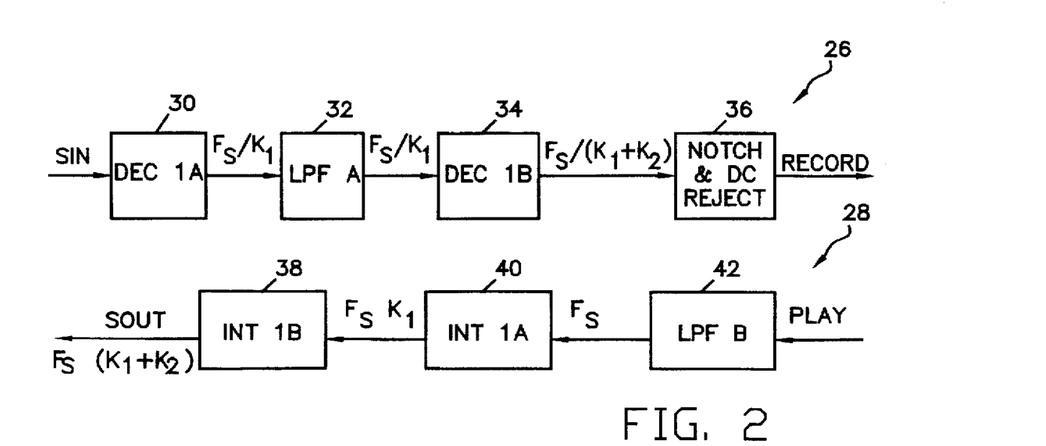
FIG. 2 is a block diagram of a series of functional blocks within a data flow path of the exemplary codec, each functional block having a unique sequence of micro instructions.

FIG. 2 illustrates an exemplary data flow path through decimate controller 26, and another data flow path through interpolate controller 28. Decimate controller 26 may, according to one embodiment, receive SIN signal and decimate that signal via decimator 1A to a lower sample rate given as a function of decimation rate change factor $K_1$. Subsequent to decimator 1A, denoted as reference numeral 30, a low pass filter A denoted as numeral 32 removes high frequency noise, possibly noise attributed to the analog-to-digital modulation and sample routine. Decimator 1B is used to further reduce the data flow rate by another decimation factor $K_2$. Decimator 1B is shown as reference numeral 34, followed by a notch and DC reject filter 36. Decimate controller block 26 is shown in only one exemplary form for sake of brevity. It is understood that one or possibly more than two decimation stages may be utilized depending upon the amount of attenuation needed within the aliasing bands. Further, interpolate controller 28 may include one, or more than two interpolation blocks shown in FIG. 2 as blocks 38 and 40. Interpolation blocks 40 and 38 serve to increase data transfer rate by factor $K_1$ and $K_2$, respectively. Decimate controller 26 and interpolate controller 28 may each require more than one low pass filter shown in FIG. 2 as low pass filters 32 and 42, respectively. Accordingly, decimate controller 26 and interpolate controller 28 can be presented in numerous forms, only two of which are shown only for the purpose of explaining an exemplary sequence of macro instructions, and an exemplary sequence of micro instructions attributable to each exemplary functional block shown as reference numbers 30 through 42. FIG. 2 illustrates seven functional blocks; however, it is to be appreciated that less than seven or more than seven functional blocks, each having a separate and unique sequence of micro instructions, fall within the spirit and scope of the present invention.

Figure 3:
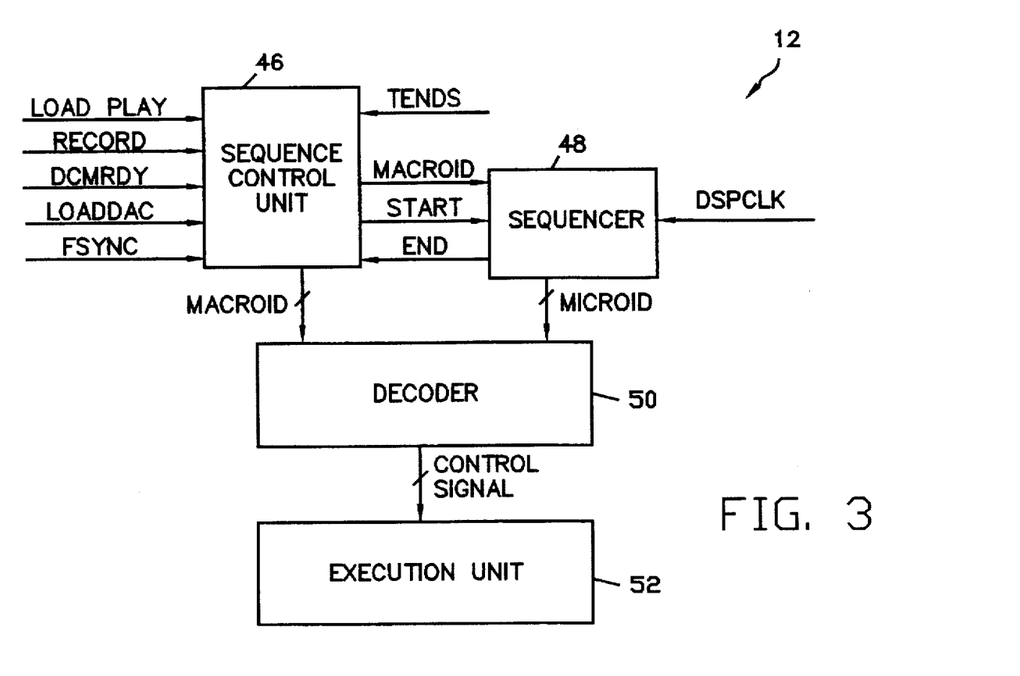
FIG. 3 is a block diagram of the digital signal controller having a sequence control unit, a sequencer, a decoder, and an execution unit coupled as shown.

FIG. 3 is a block diagram of digital signal controller 12. Digital signal controller 12 includes a sequence control unit 46, a sequencer 48, a decoder 50, and an execution unit 52. Sequence control unit 46 receives the various enable signals of FIG. 1 for enabling data transfer through controller 12. Further, sequence control unit 46 receives an FSYNC signal which initiates the beginning of a sequence of macro instructions. Macro instructions are thereby synchronized with the FSYNC signal, wherein an entire sequence of macro instructions must be performed within the FSYNC period. Sequence control unit 46 recognizes two types of operations. The first type of operation generally involves data transfer via SIN, RECORD BUS, PLAY BUS, and SOUT through controller 12. The next set of operations involves a sequence of algorithmic manipulations brought about by, for example, digital filtering and data rate change associated with decimation and interpolation functions. In the former instance, the various enable signals (LOAD PLAY, RECORD, DCMRDY, LOAD DAC) serve to begin data transfer, whereupon data transfer is terminated upon receiving TENDS signal. In the latter instance, execution of an algorithmic sequence involves "identifying" current functional blocks undergoing a macro step to both sequencer 48 and decoder 50. Sequence control unit 46, in the latter instance, keeps track of the particular macro instruction currently encountered within a sequence of macro instructions.

The current macro instruction is forwarded as a macro instruction identifier, or MACROID, to sequencer 48 and decoder 50. As each macro instruction begins, a START signal is forwarded to sequencer 48, wherein sequencer 48 recognizes that a first micro instruction attributed to the identified macro instruction, or MACROID, is to begin. The sequence of micro instructions begun by the START signal are those micro instructions associated with the particular or current macro instruction identified by the MACROID. Sequencer 48 sequences through the micro instructions until the last micro instruction is encountered, whereby an END signal is forwarded from sequencer 48 to sequence control unit 46. Upon receipt of the END signal, control unit 46 causes transition to the next macro instruction step within the sequence of macro instructions, and the process is repeated.

The resulting current macro instruction and current micro instruction are forwarded as MACROID and MICROID from control unit 46 and sequencer 48. Decoder 50 decodes those instructions according to simple AND-OR logic. The current value of MACROID and MICROID signals thereby decode as a particular control signal or signals which perform a unique set of executions within execution unit 52.

Figure 4:
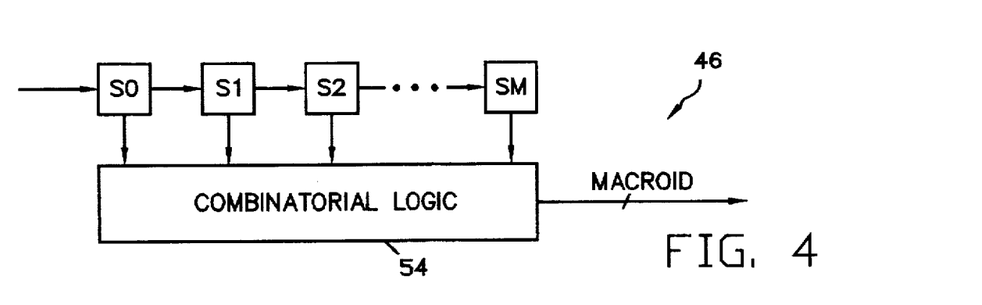
FIG. 4 is a block diagram of the sequence control unit.

Referring now to FIG. 4, a block diagram of sequence control unit 46 is shown. Sequence control unit 46 includes a series-connected set of shift registers, labeled as S0 through SM. Accordingly, M+1 number of shift registers within control unit 46 can store M+1 number of macro instructions. Outputs from each shift register are routed into combinatorial logic 54. Logic 54 is designed to distinguish macro instructions repeated within shift registers S0 through SM. For example, the first macro instruction and the tenth macro instruction within a sequence of macro instructions may be an enable interpolation instruction (i.e., enable functional block 38 of FIG. 2). Combinatorial logic 54 distinguishes those two similar macro instructions and makes relevant the current macro instruction (e.g., the enable interpolation instruction) as the current macro instruction (MACROID) within the sequence. Accordingly, combinatorial logic 54 enables an accurate, current MACROID output.

Figure 5:
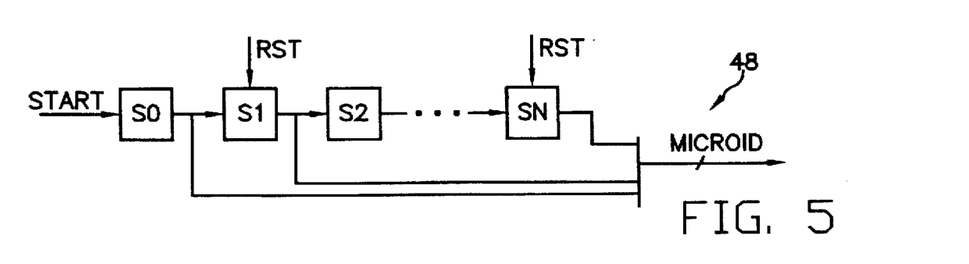
FIG. 5 is a block diagram of the sequencer.

FIG. 5 is a block diagram of sequencer 48. Sequencer 48 includes series-connected shift registers S0 through SN. Accordingly, there are N+1 number of shift registers for storing a maximum of N+1 micro instructions. Each micro instruction within shift registers S0 through SN is unique to itself, and therefore, combinatorial logic is not required to distinguish those instructions. The current micro instruction is determined by the state of the shift registers, wherein shift register S0–SN status indicates the current micro instruction, referenced as MICROID. There may be instances in which the current sequence of micro instructions do not occupy all N+1 shift registers. For example, there may only be one micro instruction for a given functional block. In this instance, a reset (RST) signal is forwarded to shift register S1 to clear sequencer 48 at the next clock transition. For example, functional block 30 of FIG. 2 describing decimator 1A functionality is referenced below in Table I as having only a single micro instruction. It is noted that MACROID and MICROID preferably comprise "one hot encodings" in which a particular bit being set within the MACROID (MICROID) indicates a particular macro (micro) instruction. Other encodings may be used in other embodiments.

Figure 6:
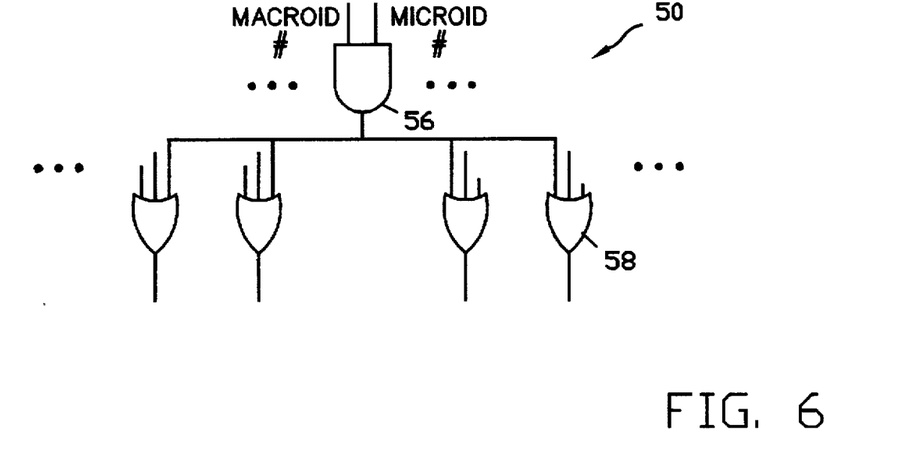
FIG. 6 is a logic diagram of the decoder.

Referring now to FIG. 6, a partial logic diagram of decoder 50 is shown. Decoder 50 is preferably constructed from an AND-OR configuration. Specifically, decoder 50 includes a series of two-input AND gates, and each AND gate includes an output fed to one input of a series of multiple input OR gates. FIG. 6 illustrates, for sake of brevity, only one two-input AND gate 56 having an output connected to one input of a series of OR gates 58. It is understood that decoder 50 includes multiple AND gates, each having an output connection as shown. It is also understood that the output of AND gate 56 can connect to one or a plurality of multiple-input OR gates 58.

Explanation of decoder 50 is best presented in the form of an example. In this example, a fifth macro instruction (designated as MACROID #=5) within the sequence of macro instructions is forwarded to one input AND gate 56, and a second micro instruction (designated as MICROID #=2) within a sequence of micro instructions is forwarded to the other input of AND gate 56. If, for example, the fifth macro instruction is the enable interpolator 1A, shown as functional block 40 in FIG. 2, and if the second micro instruction within interpolator 1A functional block is tb<— (acc shr1)+0, then OR gates 58 decode all required control signals to be forwarded to the execution unit. Continuing with this example, the decoded control signals enable the accumulator register at the output of one OR gate, enable the shift right register to shift right by one at the output of another OR gate, issues a command to forward the accumulated value to an adder at the output of yet another OR gate, and enables the adder to add the accumulated value with a zero value from the output of still another OR gate. The various command signals, and their significance with respect to executing the decoded MACROID #=5 and MICROID #=2 will be further described in reference to Table I exemplary micro instructions in combination with FIGS. 10a and 10b exemplary macro instructions.

Figure 7:
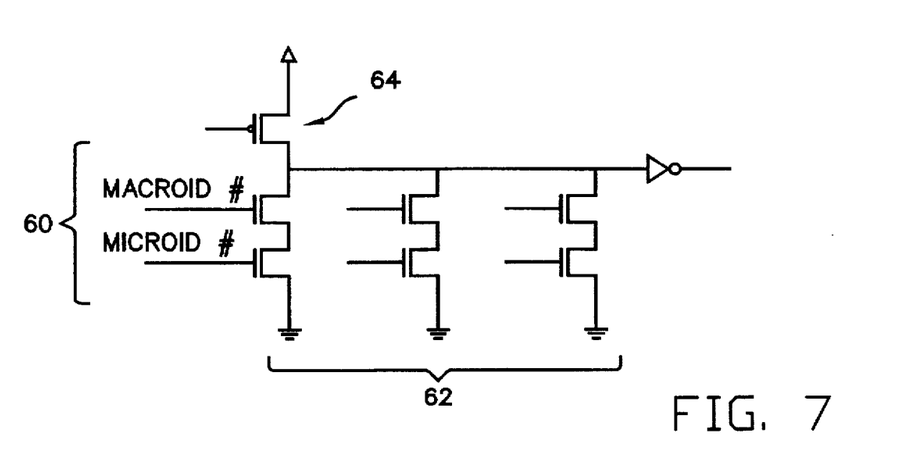
FIG. 7 is a partial transistor-level diagram of the decoder.

FIG. 7 illustrates dynamic logic used to realize the AND-OR structure of decoder 50. FIG. 7 illustrates a two input AND gate 60 connected in series with a three input OR gate 62. Instead of using static logic and having P-channel transistors attributed to each AND as well as each OR function, dynamic logic shown in FIG. 7 utilizes a single P-channel transistor for equivalent functionality. The P-channel transistor within the dynamic logic of FIG. 7 is shown as reference numeral 64. Dynamic logic advantageously uses fewer gates and consumes less power than comparable static logic designs.

Figure 8:
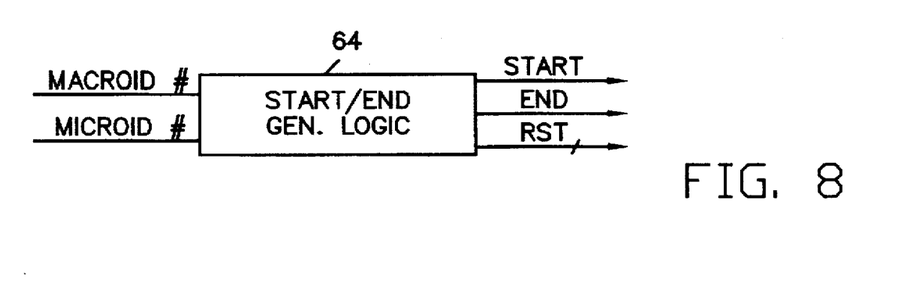
FIG. 8 is a block diagram of a start/end generation logic unit used, among others, for signaling the starting and ending steps within the micro instruction sequence.

Turning now to FIG. 8, START/END, as well as RST generation logic 64 is shown. Provided sequence control unit 46 and sequencer 48 shown in FIG. 3 are enabled, and provided a current macro instruction (MACROID #) appears at the input of logic 64, then a START signal is forwarded from logic 64 to sequencer 48. Responsive to a START signal, sequencer 48 begins a sequence of micro instructions attributed to the MACROID # appearing at the input of logic 64. Logic 64 thereby encompasses, for example, NAND gates which receive macro instructions for enabling each functional block. The output of the NAND gates are fed to other logic gates, such as NOR gates, which then present the START signal. Thus, once a MACROID # is asserted at the output of combinatorial logic 54, shown in FIG. 4, the START signal is asserted to begin sequencing the attributed micro instructions. Once sequencing of the attributed micro instructions is begun, the START signal is deasserted.

Logic 64 also includes END generation logic. Once both MACROID # and MICROID # are deasserted at the output of sequence control unit 46 and sequencer 48, shown in FIG. 3, logic 64 issues an END signal. The END generation logic may be a separate portion from the START generation logic within logic block 64. Logic 64 may also include a reset generation circuit. Knowing the particular MACROID # and MICROID #, logic 64 determines that a specific number of micro instructions are attributable to that MACROID #. Given the current MICROID # within the sequence of micro instructions, logic 64 determines that the last step of micro instructions within current MACROID # has been encountered. Upon occurrence of last micro instruction within the given MACROID #, logic 64 presents a reset, RST, signal at its output. The decoded RST signal is then routed to the shift registers of sequencer 48. RST is used to clear shift registers S0 through SN during times in which a micro instruction sequence fills less than all N number of shift registers. In the exemplary micro instructions given above, the functional block of decimator 1A includes only one micro instruction. Thus, when the last micro instruction (i.e., the first and only micro instruction) within the decimator 1A has been encountered, the RST signal is decoded and placed upon shift register S1 of sequencer 48 to clear sequencer 48 prior to receiving the next sequence of micro instructions. Accordingly, clock cycles are not needed for clocking zero states through all S0 through SN shift registers. Thus, resetting specific shift registers allows for a more efficient use of clock cycles.

Logic 64 is therefore used to provide an indication to sequencer 48 of the start of a new MACROID # requiring initiation of a new sequence of micro instructions. Logic 64 is also used to provide indication to sequence control unit 46 of the end of a sequence of micro instructions. The end of a sequence of micro instructions allows the sequence control unit 46 to transition to the next MACROID #. Still further, logic 64 presents RST signals decoded to sequencer 48 upon receipt of a MICROID # having a shortened number of micro instructions (i.e., less than N number of micro instructions). It is noted that a single RST signal may be connected to each shift registers S0–SN, as opposed to the multiple RST signals shown in FIG. 8.

Figure 9:
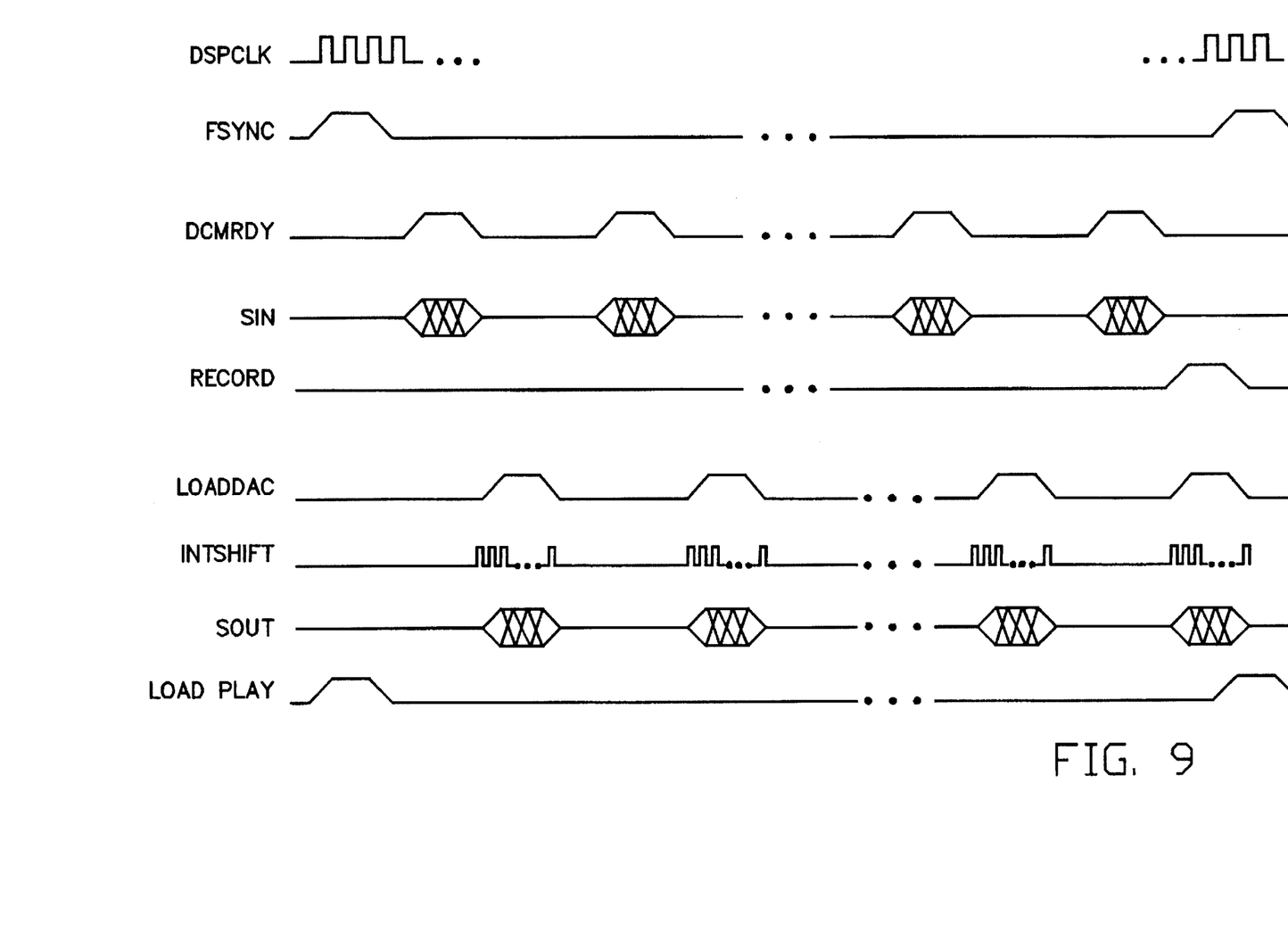
FIG. 9 is a timing diagram of signal flow to and from the digital signal controller.

Turning now to FIG. 9, a timing diagram is illustrated of signals sent to and from digital signal controller 12. A better understanding of the various signals and operations resulting therefrom, are provided in reference to FIGS. 1, 3 and 9 in combination. DSPCLK is forwarded from DSP 16 to sequencer 48 of digital signal controller 12. Sequencer 48 thereby strobes micro instructions at transitions of DSPCLK. Signal FSYNC is derived from DSP 16 to initiate the sequence of macro instructions upon transition of FSYNC. DCMRDY enables transfer of SIN from analog interface 14 to controller 12, as shown. An active RECORD signal is used to enable transfer of signals across RECORD BUS. LOADDAC is used to enable transfer, during cycles of INTSHIFT, the SOUT data stream from controller 12 to analog interface 14. An active LOAD PLAY signal is used to enable transfer of signals across PLAY BUS from DSP 16 to controller 12.

Figure 10A:
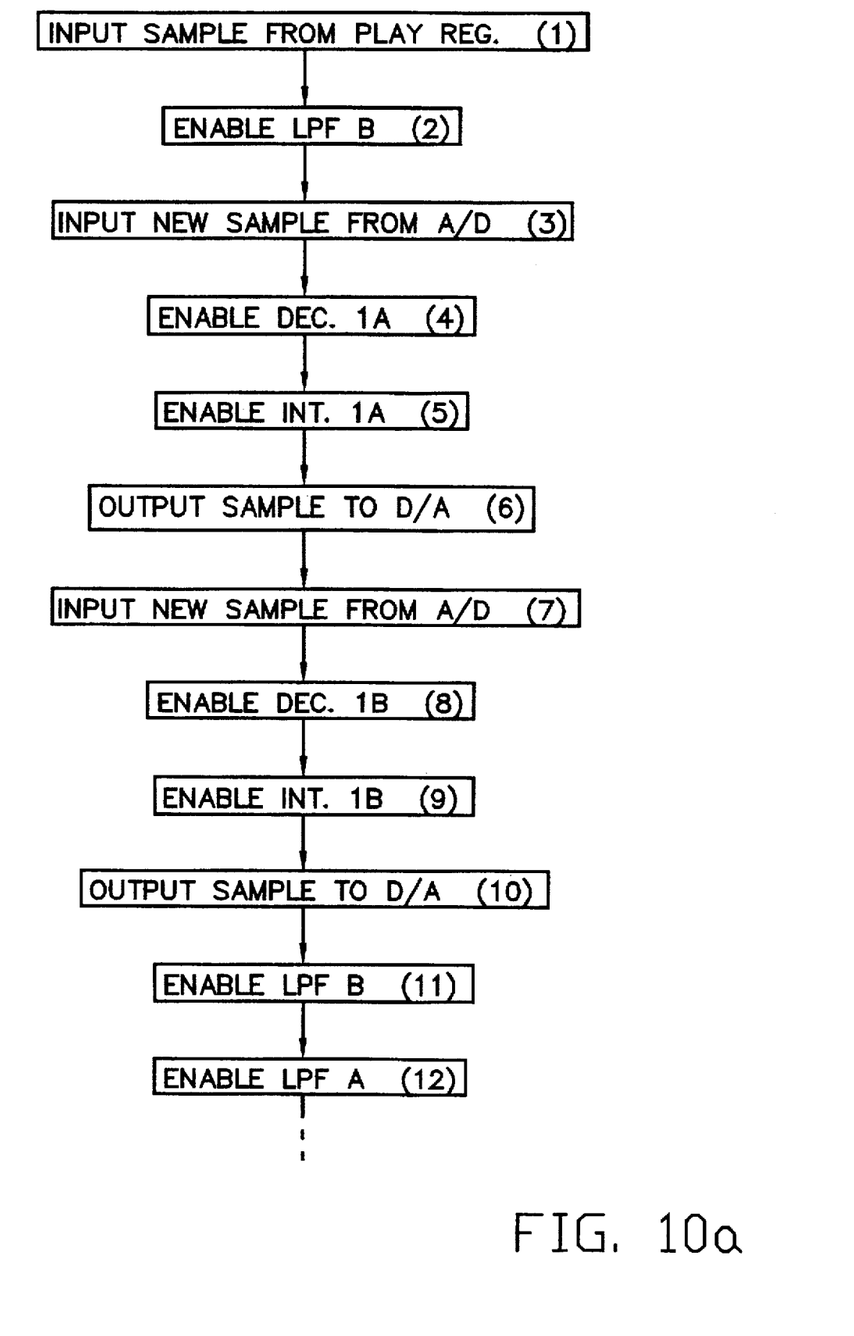
FIGS. 10a–10b is a flow diagram of a macro instruction sequence, shown according to one exemplary embodiment.
Figure 10B:
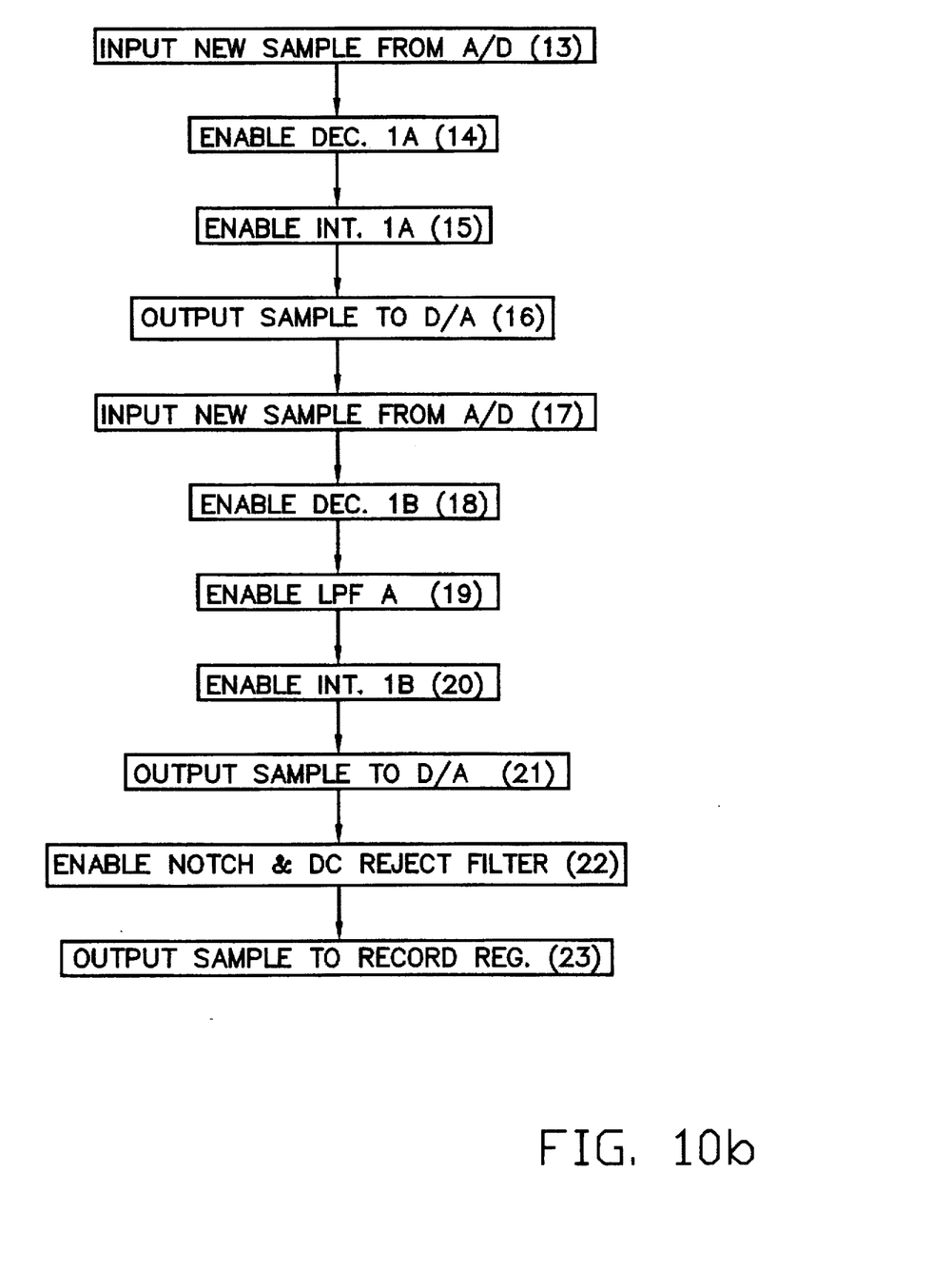

Referring now to FIGS. 10a–10b, an exemplary sequence of macro instructions are shown. The exemplary sequence is provided as an aid to understanding the broader application to which the present invention is derived. FIGS. 10a–10b illustrate a sequence of macro instructions used to transfer data through controller 12 of FIG. 1, and to operate the various functional blocks arranged within the data flow path of FIG. 2. The first macro step (MACROID #=1) serves to input a sample of digital signals from DSP 16 via PLAY BUS. The next macro instruction (MACROID #=2) enables low pass filter B. An active DCMRDY during MACROID #=3 enables transfer of SIN from analog interface 14 to controller 12. FIG. 10a illustrates twelve steps within the sequence of macro instructions (i.e. MACROID #=1 through MACROID #=12). FIG. 10b is a continuation of the macro instruction steps beginning with MACROID #=13 and ending with MACROID #=23.

Accordingly, the exemplary macro instruction sequence shown in FIGS. 10a and 10b includes 23 steps beginning with inputting a sample across the PLAY BUS, and ending with outputting a sample across the RECORD BUS. In the interim, various algorithmic manipulations may arise as data is called upon to flow through various functional blocks set forth in exemplary form in FIG. 2. Each functional block comprises a specific sequence of micro instructions. Accordingly, data flow and data manipulation is controlled within controller 12 according to the sequence of macro instructions and, depending upon which functional block is enabled, in accordance with a specific sequence of micro instructions. An exemplary form of micro instructions for low pass filter B (MACROID #=2 and 11), enable decimator 1A (MACROID #=4 and 14), enable interpolator 1A (MACROID #=5 and 15), enable decimator 1B (MACROID #=8 and 18), enable interpolator 1B (MACROID #=9 and 20), enable low pass filter A (MACROID #=12 and 19), and enable notch and DC reject filter (MACROID #=22) is illustrated hereinbelow in Table I.

Figure 11:
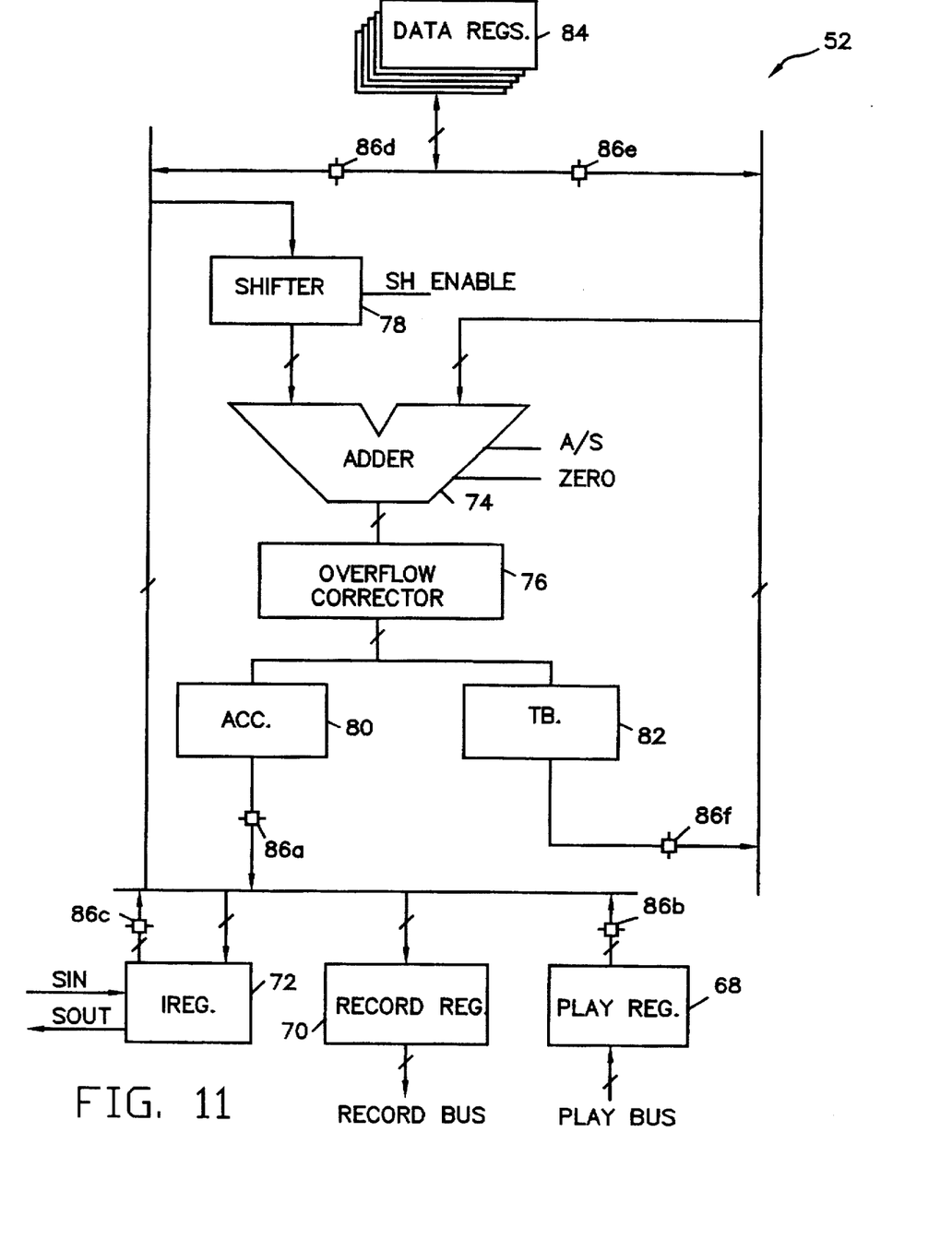
FIG. 11 is a block diagram of the execution unit.

Referring now to FIG. 11, execution unit 52 is shown according to one embodiment. Execution unit 52 includes a play register 68 coupled to receive PLAY BUS signals from the DSP. RECORD register 70 is used to temporarily store RECORD BUS signals prior to outputting them to the DSP. Interface register 72 is used to buffer and convert serial data streams SIN and SOUT to parallel busses arranged internal to execution unit 52. Accordingly, register 68, 70 and 72 interface with data flow to and from controller 12. Registers 68, 70 and 72 also present data to execution adder 74, overflow corrector 76, shifter 78, accumulator 80 and temporary buffer 82 for algorithmic manipulation thereon.

Execution unit 52 performs data manipulation by utilizing adder 74, overflow corrector 76, shifter (preferably a right shifter) 78, accumulator register 80, and temporary buffer 82. Adder 74, when properly enabled, adds or subtracts signals upon its input, based upon control of data to or from registers 68, 70 and 72, as well as data to and from a series of data registers 84. Data registers 84 maintain data within execution unit 52. The number of data registers 84 is directly related to the number of taps of a digital filter set forth herein, such as low pass, decimation, notch, etc. Accordingly, each data register within the set of data registers 84 can be used to store data resulting from a macro instruction within the sequence of macro instructions.

Merely as an example, if the fifth macro instruction (i.e., MACROID #=5) is forwarded to decoder 50 along with the second micro instruction (i.e., MICROID #=2), then from FIG. 10a and Table I, control signals sent to the execution unit cause the operation tb ←(acc shr1)+0 to be performed. The control signals thereby allow flow of a value from accumulator register 80, enables right shift of that data by shifter 78, and then enables add zero of adder 74 such that the shifted data is added to a zero value. The result of that add is stored in temporary buffer 82. Partial decoder 50, shown in FIG. 6, provides numerous outputs for MACROID #=3 and MICROID #=2 inputs. Those outputs, or control signals, select data flow and enable various components within execution unit 52. Data flow is controlled by transmission gates 86a–86f, and components are enabled by enable signals associated with each component (e.g., SH ENABLE which includes signals enabling each shift amount, add/subtract (A/S) which determines if adder 74 should perform addition or subtraction, ZERO which causes adder 74 to add zero to the output of shifter 78, etc.). It is noted that each register within execution unit 82 may further include an enable signal which causes the register to store results from adder 74 or overflow corrector 76.

It would be appreciated to those skilled in the art to having the benefit of this disclosure that this invention is believed to be capable of interfacing between numerous types of DSPs, analog-to-digital converters and digital-to-analog converters. Furthermore, it is also to be understood that the form of the invention shown and described is to be taken merely as presently preferred examples of how the digital signal controller can be controlled by a modular technique employing macro instructions derived from a sequence control unit separate from micro instructions derived from a sequencer. Changes to the macro instructions affect the sequence control unit and possibly the decoder, but may not necessarily affect the sequencer. Conversely, changes to micro instructions affect the sequencer and possibly the decoder, but not necessarily the sequence control unit. Accordingly, the present design can be easily adapted to conventional DSPs and analog interface units while supporting changes to the overall functionality of the digital signal controller without having to change the entire controller. It is intended that the following claims be interpreted to embrace all such modifications and changes.

TABLE I

| | | Decimator 1A |
|---|---|---|
| 00 | reg3 | ← ireg |
| | | Decimator 1B |
| 00 | acc | ← (reg1 shr 1) + reg1; reg29 ← reg1 |
| 01 | tb | ← (acc shr 2) + 0 |
| 02 | tb | ← (reg2 shr 4) + tb |
| 03 | tb | ← (reg3 shr 2) + tb |
| 04 | tb | ← (reg4 shr 2) + tb |
| 05 | reg1 | ← ireg |
| 06 | acc,tb | ← (reg1 shr 4) + tb |
| 07 | t2 | ← acc |
| 08 | acc | ← reg5 + tb |
| 09 | reg7,ireg | ← acc |
| 10 | reg5 | ← t2 |
| 11 | reg4 | ← reg3 |
| 12 | reg2 | ← reg29 |
| | | LOW-PASS FILTER A |
| 00 | acc | ← -(reg6 shr 2) + reg6; reg29 ← reg6 |
| 01 | acc | ← (acc shr3) + reg6 |
| 02 | acc | ← -(acc shr2) + reg6 |
| 03 | tb | ← (acc shr1) + reg7 |
| 04 | acc | ← -(reg8 shr 4) + reg8 |
| 05 | tb | ← acc + tb |
| 06 | reg6 | ← reg7 |
| 07 | reg8 | ← reg29 |
| 08 | acc | ← (reg9 shr 2) + reg9 |
| 09 | acc | ← (acc shr 3) + reg9 |
| 10 | tb | ← -(acc shr 2) + tb |
| 11 | acc | ← -(reg10 shr 3) + reg10; reg9 ← reg10 |
| 12 | acc,tb | ← (acc shr 2) + tb |
| 13 | reg10 | ← acc |
| 14 | reg29 | ← reg11 |
| 15 | acc | ← -(reg10 shr 2) + tb |
| 16 | acc | ← (acc shr 3) + tb |
| 17 | acc,tb | ← (acc shr 2) + 0 |
| 18 | reg11 | ← acc |
| 19 | tb | ← reg29 + tb |
| 20 | tb | ← (reg12 shr 1) + tb |
| 21 | reg12 | ← reg29 |
| 22 | acc | ← (reg13 shr 2) + reg13 |
| 23 | acc | ← (acc shr 4) + reg13 |
| 24 | acc | ← -(acc shr 2) + reg13 |
| 25 | tb | ← -(acc + tb) |

TABLE I-continued

| | | |
|---|---|---|
| 26 | reg13 | ← reg14 |
| 27 | acc | ← (reg14 shr 4) + reg14 |
| 28 | acc | ← (acc shr 2) + tb |
| 29 | reg14, ireg | ← acc |

NOTCH AND DC REJECT FILTER

| | | |
|---|---|---|
| 00 | acc | ← reg15 + reg15 |
| 01 | acc | ← (acc shr 2) + reg16 |
| 02 | acc | ← (acc shr 2) + reg16 |
| 03 | acc,tb | ← -(acc shr 1) + reg14 |
| 04 | acc | ← (acc shr 2) + tb |
| 05 | acc | ← -(acc shr 2) + tb |
| 06 | acc | ← -(acc shr 4) + tb |
| 07 | reg29 | ← acc |
| 08 | acc | ← reg16 + 0 |
| 09 | acc | ← -acc + reg15 |
| 10 | acc | ← (acc shr 2) + reg15 |
| 11 | acc | ← -(acc shr 1) + reg16 |
| 12 | acc | ← (acc shr 1) + reg16 |
| 13 | acc | ← -acc + reg15 |
| 14 | acc | ← -(acc shr 4) + reg15 |
| 15 | t2 | ← acc |
| 16 | acc | ← reg16 + 0 |
| 17 | acc | ← acc + reg15 |
| 18 | acc | ← (acc shr 2) + reg16 |
| 19 | acc | ← (acc shr 1) + reg15 |
| 20 | acc | ← (acc shr 1) + reg15 |
| 21 | acc | ← acc + reg16 |
| 22 | tb | ← -(acc shr 4) + reg16 |
| 23 | reg15 | ← t2 |
| 24 | acc | ← (reg17 shr 2) + tb |
| 25 | reg16 | ← acc |
| 26 | acc | ← reg29 + 0 |
| 27 | tb | ← acc + reg19 |
| 28 | tb | ← -reg20 + tb |
| 29 | reg20 | ← reg29 |
| 30 | acc | ← -(reg19 shr 6) + tb |
| 31 | reg19 | ← acc |
| 32 | acc | ← (reg19. shr 2) + tb; overflow correction on |
| 33 | record,ireg | ← acc |

LOW-PASS FILTER B

| | | |
|---|---|---|
| 00 | acc | ← -(reg21 shr 2) + reg21; reg29 ← reg21 |
| 01 | acc | ← (acc shr 3) + reg21 |
| 02 | acc | ← -(acc shr 2) - reg21 |
| 03 | tb | ← (acc shr 1) + 0 |
| 04 | acc | ← -(reg22 shr 4) + reg22 |
| 05 | tb | ← acc + tb |
| 06 | reg21 | ← play |
| 07 | reg22 | ← reg29 |
| 08 | acc | ← (reg23) + reg23 |
| 09 | acc | ← (acc shr 3) + reg9 |
| 10 | tb | ← -(acc shr 2) + tb |
| 11 | acc | ← -(reg24 shr 3) + reg24; reg23 ← reg24 |
| 12 | acc,tb | ← (acc shr 2) + tb |
| 13 | reg24 | ← acc |
| 14 | reg29 | ← reg25 |
| 15 | acc | ← -(reg24 shr 2) + tb |
| 16 | acc | ← (acc shr 3) + tb |
| 17 | acc,tb | ← (acc shr 2) + 0 |
| 18 | reg25 | ← acc |
| 19 | tb | ← reg29 + tb |
| 20 | tb | ← (reg0 shr 1) + tb |
| 21 | reg0 | ← reg29 |
| 22 | acc | ← (reg26 shr 2) + reg26 |
| 23 | acc | ← (acc shr 4) + reg26 |
| 24 | acc | ← -(acc shr 2) + reg26 |
| 25 | tb | ← -(acc+ tb) |
| 26 | reg26 | ← reg17 |
| 27 | acc | ← (reg17 shr 4) + reg17 |
| 28 | acc | ← (acc shr 2) + tb |
| 29 | reg17,ireg | ← acc |

INTERPOLATOR 1A

| | | |
|---|---|---|
| 00 | acc | ← (reg28 shr 1) + reg28 |
| 01 | tb | ← (acc shr 1) + 0 |
| 02 | acc | ← reg30 + 0 |
| 03 | acc | ← acc + reg17 |
| 04 | acc | ← (acc shr 3) + tb |
| 05 | ireg | ← acc |
| 06 | reg29 | ← reg28 |
| 07 | reg28 | ← reg18 |
| 08 | reg30 | ← reg29 |

INTERPOLATOR 1B

| | | |
|---|---|---|
| 00 | acc | ← reg28 + 0 |
| 01 | acc | ← acc + reg30 |
| 02 | acc | ← (acc shr 1) + 0 |
| 03 | ireg | ← acc |

What is claimed is:

1. A digital signal controller, comprising:
   a sequence control unit comprising a first set of series-connected shift registers wherein when operating, said sequence control unit produces responsive to a current state of said first set of series-connected shift registers, a signal indicating a current macro instruction within a sequence of macro instructions;
   a sequencer coupled to receive initiation of said current macro instruction from said sequence control unit and, said sequencer, when operating, produces a signal indicating a current micro instruction within a sequence of micro instructions attributable to said current macro instruction;
   a decoder coupled to said sequence control unit and said sequencer for operably producing a current control signal upon receipt of said current macro instruction and said current micro instruction; and
   an execution unit coupled to said decoder for performing algorithmic manipulations of data according to said current control signal.

2. The digital signal controller as recited in claim 1, wherein said current macro instruction is selected from said sequence of macro instructions during a macro identification step.

3. The digital signal controller as recited in claim 1, wherein said current micro instruction is generated from said sequence of micro instructions during a micro identification step.

4. The digital signal controller as recited in claim 1, wherein the sequence control unit further comprises:
   combinatorial logic coupled to each of said shift registers for producing said current macro instruction responsive to the current state of said first set of series-connected shift registers, wherein said combinatorial logic is adapted to indicate the same macro instruction for more than one state of said first set of series-connected shift registers if that macro instruction is repeated in said sequence of macro instructions.

5. The digital signal controller as recited in claim 4, wherein the number of shift registers in said first set is equal to a maximum number of macro instructions within said sequence of macro instructions.

6. The digital signal controller as recited in claim 1, wherein said sequencer comprises a second set of series-connected shift registers, and wherein the number of shift registers in said second set is equal to a maximum number of micro instructions within said sequence of micro instructions.

7. The digital signal controller as recited in claim 1, wherein said decoder comprises:
   a two input AND gate coupled to receive respective said current macro instruction and said current micro instruction;

at least one OR gate coupled to an output of said AND gate.

8. The digital signal controller as recited in claim 7, wherein said AND and OR gates are coupled according to dynamic logic, wherein the two input AND gate is coupled in series with a pull-up transistor between a power supply and ground.

9. The digital signal controller as recited in claim 1, wherein said execution unit comprises a programmable processor core comprising an adder, an accumulator, a shifter and a plurality of storage registers.

10. A codec comprising:

a digital signal controller coupled between an analog interface unit and a digital signal processor for transferring and filtering, according to a sequence of macro and micro instructions, digital information between the analog interface unit and the digital signal processor;

said digital signal controller comprises a decoder, a sequence control unit and a sequencer interconnected with one another, said decoder is coupled to produce control signals upon receipt of said sequence of macro and micro instructions from said sequence control unit and said sequencer, respectively;

said digital signal controller comprises an execution unit coupled to an output of said decoder for performing, according to the control signals forwarded from said decoder;

(i) a sequence of data transfers between said analog interface unit and said digital signal processor; and (ii) a sequence of arithmetic instructions.

11. The codec as recited in claim 10, wherein said analog interface unit comprises an analog-to-digital converter and a digital-to-analog converter.

12. The codec as recited in claim 10, wherein said execution unit comprises:

a first set of registers for storing, according to said sequence of data transfers, digital information forwarded from said analog interface unit and said digital signal processor; and a second set of registers for storing outputs resulting from the sequence of instructions.

13. The codec as recited in claim 12, wherein said first set of registers comprise play and record registers.

14. The codec as recited in claim 12, wherein said second set of registers comprise an accumulator and a temporary buffer.

15. The codec as recited in claim 12, wherein said second set of registers comprise a series of data registers.

16. The codec as recited in claim 10, wherein said execution unit comprises a shifter, an adder, and a plurality of transmission gates connected to perform digital filtering.

17. The codec as recited in claim 16, wherein said digital filtering comprises decimation, low pass and notch filtering.

18. A method for controlling a sequence of instructions, comprising:

providing a decoder;

controlling a sequence of macro instructions by shifting a first set of series connected shift registers;

issuing a macro instruction within said sequence of macro instructions to said decoder, wherein said macro instruction corresponds to the state of said first set of series connected shift registers;

issuing a micro instruction within a sequence of micro instructions to said decoder, said micro instruction is unique to said macro instruction; and performing digital signal manipulation according to said issued macro and micro instructions.

19. The method as recited in claim 18, wherein said performing step comprises transferring data between a digital signal processor and an analog interface unit.

20. The method as recited in claim 18, wherein said performing step comprises arithmetically changing data according to decimation, interpolation or filtering algorithms.

21. A digital signal controller, comprising:

a sequence control unit, comprising:

a series-connected first set of shift registers; and combinatorial logic coupled to each of said first set of shift registers for producing a coded value indicative of a current macro instruction within a sequence of macro instructions;

a sequencer comprising a series-connected second set of shift registers, wherein said sequencer is coupled to receive initiation of said current macro instruction from said sequence control unit, and wherein said sequencer, when operating, produces a coded value indicative of a current micro instruction within a sequence of micro instructions attributable to said current macro instruction in response to a current state of said second set of shift registers;

a decoder coupled to said sequence control unit and said sequencer for operably producing a current control signal upon receipt of the coded values indicative of said current macro instruction and said current micro instruction; and an execution unit coupled to said decoder for performing algorithmic manipulations of data according to said current control signal.

22. The digital signal controller as recited in claim 21, wherein said current macro instruction is selected from said sequence of macro instructions during a macro identification step.

23. The digital signal controller as recited in claim 21, wherein said current micro instruction is generated from said sequence of micro instructions during a micro identification step.

24. The digital signal controller as recited in claim 21, wherein said combinatorial logic produces the coded value indicative of the current macro instruction in response to a current state of said first set of shift registers.

25. The digital signal controller as recited in claim 21, wherein the number of shift registers within said first set of shift registers is equal to a maximum number of macro instructions within said sequence of macro instructions.

26. The digital signal controller as recited in claim 21, wherein the number of shift registers within said second set of shift registers is equal to a maximum number of micro instructions within said sequence of micro instructions.

* * * * *